United States Patent
Edwards et al.

(10) Patent No.: US 10,386,550 B2
(45) Date of Patent: Aug. 20, 2019

(54) RETROREFLECTIVE ARTICLES WITH ANTI-STAINING PROPERTIES

(71) Applicant: 3M INNOVATIVE PROPERTIES COMPANY, St. Paul, MN (US)

(72) Inventors: Bruce H. Edwards, White Bear Lake, MN (US); Shri Niwas, Maple Grove, MN (US); Cheryl S. Elsbernd, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 221 days.

(21) Appl. No.: 15/030,290

(22) PCT Filed: Oct. 13, 2014

(86) PCT No.: PCT/US2014/060230
§ 371 (c)(1),
(2) Date: Apr. 18, 2016

(87) PCT Pub. No.: WO2015/061065
PCT Pub. Date: Apr. 30, 2015

(65) Prior Publication Data
US 2016/0245966 A1 Aug. 25, 2016

Related U.S. Application Data

(60) Provisional application No. 61/895,089, filed on Oct. 24, 2013.

(51) Int. Cl.
*G02B 5/128* (2006.01)
*B32B 37/12* (2006.01)
(Continued)

(52) U.S. Cl.
CPC .............. *G02B 5/128* (2013.01); *B32B 37/12* (2013.01); *B32B 37/14* (2013.01); *B32B 38/10* (2013.01); *B32B 2307/416* (2013.01)

(58) Field of Classification Search
CPC .......... G02B 5/12; G02B 5/122; G02B 5/124; G02B 5/128; B32B 37/12; B32B 37/14; B32B 38/10; B32B 2307/416
(Continued)

(56) References Cited

U.S. PATENT DOCUMENTS

| 1,175,224 A | 3/1916 | Bleecker |
| 2,461,011 A | 2/1949 | Taylor |

(Continued)

FOREIGN PATENT DOCUMENTS

| EP | 1273934 | 1/2003 |
| EP | 1584738 | 10/2005 |

(Continued)

OTHER PUBLICATIONS

International Search Report for PCT International Application No. PCT/US2014/060230, dated Jan. 5, 2015, 4pgs.

*Primary Examiner* — Euncha P Cherry
(74) *Attorney, Agent, or Firm* — Jeffrey M. Olofson

(57) ABSTRACT

Methods for preparing retroreflective articles include providing a thermoplastic polymeric carrier layer, partially embedding transparent microspheres into the surface of the carrier layer so that the beads partially protrude from the surface of the carrier layer, depositing a metal reflective layer on the microspheres, applying a treatment solution to the metal layer, and applying a bead bond layer to the treated metal layer, to form an intermediate article. Upon removal of the carrier layer, the deposited metal layer not in contact with the surface of the microspheres remains present on the carrier layer, to form retroreflective articles with a discontinuous layer of reflective metal disposed only on the surface of the transparent microspheres.

21 Claims, 1 Drawing Sheet

(51) Int. Cl.
*B32B 37/14* (2006.01)
*B32B 38/10* (2006.01)

(58) Field of Classification Search
USPC ............................................ 359/540
See application file for complete search history.

(56) References Cited

U.S. PATENT DOCUMENTS

| | | |
|---|---|---|
| 2,726,161 A | 12/1955 | Beck |
| 2,842,446 A | 7/1958 | Beck |
| 2,853,393 A | 9/1958 | Beck |
| 2,870,030 A | 1/1959 | Stradley |
| 2,939,797 A | 6/1960 | Rindone |
| 2,965,921 A | 12/1960 | Bland |
| 2,992,122 A | 7/1961 | Beck |
| 3,468,681 A | 9/1969 | Jaupain |
| 3,946,130 A | 3/1976 | Tung |
| 4,192,576 A | 3/1980 | Tung |
| 4,367,919 A | 1/1983 | Tung |
| 4,564,556 A | 1/1986 | Lange |
| 4,678,695 A | 7/1987 | Tung |
| 4,758,469 A | 7/1988 | Lange |
| 4,772,511 A | 9/1988 | Wood |
| 4,931,414 A | 6/1990 | Wood |
| 5,283,101 A | 2/1994 | Li |
| 5,474,827 A | 12/1995 | Crandall |
| 5,812,316 A | 9/1998 | Ochi |
| 5,812,317 A | 9/1998 | Billingsley |
| 5,824,390 A | 10/1998 | Ochi |
| 6,172,810 B1 | 1/2001 | Fleming |
| 6,355,302 B1 | 3/2002 | Vandenberg |
| 7,294,731 B1 | 11/2007 | Flynn |
| 7,678,426 B2 | 3/2010 | Flynn |
| 7,723,452 B2 | 5/2010 | Hooftman |
| 9,110,235 B2 | 8/2015 | Nakajima |
| 2004/0191481 A1* | 9/2004 | Erb .................. G02B 5/128 428/143 |
| 2005/0157389 A1 | 7/2005 | Shipman |
| 2009/0021831 A1* | 1/2009 | Bacon, Jr. ............ G02B 5/124 359/530 |

FOREIGN PATENT DOCUMENTS

| | | |
|---|---|---|
| WO | WO 1992-19993 | 11/1992 |
| WO | WO 2009-134367 | 11/2009 |

* cited by examiner

RETROREFLECTIVE ARTICLES WITH ANTI-STAINING PROPERTIES

CROSS REFERENCE TO RELATED APPLICATIONS

This application is a national stage filing under 35 U.S.C. 371 of PCT/US2014/060230, filed Oct. 13, 2014, which claims the benefit of U.S. Provisional Application No. 61/895089, filed Oct. 24, 2013, the disclosure of which is incorporated by reference in its/their entirety herein.

FIELD OF THE DISCLOSURE

This disclosure relates to retroreflective articles, especially retroreflective articles with anti-staining properties and methods of making and using them.

BACKGROUND

A wide variety of articles that incorporate the phenomenon of retroreflectivity have been developed for a wide array of uses. Retroreflective articles have the ability to return a substantial portion of incident light back towards the light source. This unique ability has promoted widespread use of retroreflective safety articles. Besides traffic and warning signs and the like, a wide variety of clothing and similar articles such as backpacks, and the like have incorporated retroreflective articles into them. Persons who work or exercise near motor vehicle traffic need to be conspicuously visible so that they do not get struck by passing motor vehicles. When retroreflective articles are worn, the retroreflectivity highlights a person's presence by retroreflecting light from motor vehicle headlamps.

Retroreflective articles typically have an optical lens element layer, a polymeric binder layer, a reflective layer, and may also have a substrate layer. The optical lens elements commonly are microspheres that are partially embedded in the polymeric binder layer. The reflective layer typically is aluminum, silver, or a dielectric mirror that usually is disposed on the embedded portions of the microspheres. Light striking the front surface of the retroreflective article passes through the microspheres and is reflected by the reflective layer to re-enter the microspheres where the light's direction is then altered to travel back towards the light source. Thus, for example, when a vehicle's headlamps strike a retroreflective article, some of the light from the headlamps is reflected back to the driver of the vehicle.

It is generally not necessary, or even desirable, that an entire worn article be retroreflective, so retroreflective appliqués are often used. These retroreflective appliqués can then be attached to an article of clothing or other article to prepare a retroreflective article. In some instances, retroreflective appliqués have been made by partially embedding a microsphere layer in a thermoplastic carrier web, applying a reflective material over the microspheres' protruding portions, and then forming a binder layer over the coated microspheres. Often a pressure sensitive adhesive is applied on the binder layer's back surface, and a release liner is placed over the adhesive until the appliqué is secured to a substrate. The completed appliqué (also sometimes referred to as a transfer sheet) is supplied to a garment assembler in this form, and the garment assembler secures the appliqué to an article of clothing by removing the release liner and adhering the appliqué to an outer surface of the article of clothing. The carrier is then separated from the appliqué to expose the microspheres so that the appliqué can retroreflect light.

In order to decrease the susceptibility of retroreflective articles to corrosion and/or staining and improve durability and launderability, a number of techniques have been used to protect the reflective material layer. Examples of such techniques include encapsulation of the reflective article with a cover film as in U.S. Pat. No. 4,678,695 (Tung et al.). Other techniques have taught the use of layers or coatings to specifically protect the reflective layer such as U.S. Pat. No. 5,824,390 (Ochi et al.) which teaches the use of a thin film containing a coupling agent which is formed on the vapor-deposited metal layer prior to superposing the thermoformable support sheet to the bead layer, U.S. Pat. No. 5,474,827 (Crandall et al.) which incorporated a compound comprising an aromatic bidentate moiety in the binder layer which is chemically associated with the retroreflective elements, U.S. Pat. No. 5,812,317 (Billingsley et al.) which incorporated a polymeric intermediate layer between the microspheres of the retroreflective article, and U.S. Pat. No. 7,723,452 (Hooftman et al.) which teaches a method of treatment of retroreflective sheets with treatment compositions that comprise fluorinated compounds having one or more silyl groups, and an auxiliary compound. Another technique is described in U.S. Pat. No. 6,172,810 (Fleming et al.) which describes retroreflective articles with a layer of optical elements and multilayer reflective coating disposed on the optical elements, the multilayer reflective coating having multiple polymer layers with different refractive indices.

In U.S. Pat. No. 6,355,302, a different continuous process is described for making retroreflective articles in which a fabric is coated with a binder material and aluminized beads are applied to the coating of binder material. An etching station removes exposed portions of the aluminized coating from the beads after the binder material is allowed to solidify.

SUMMARY

Described herein are retroreflective articles, especially retroreflective articles with anti-staining properties and methods of making and using them. The methods for preparing retroreflective articles comprise providing a thermoplastic polymeric carrier layer with a first major surface and a second major surface, providing transparent microspheres, partially embedding the transparent microspheres into the first major surface of the thermoplastic polymeric carrier layer such that the beads at least partially protrude from the first major surface of the thermoplastic polymeric carrier layer, depositing a metal reflective layer on the first major surface of the thermoplastic polymeric carrier layer and the exposed surface of the partially embedded transparent microspheres, applying a treatment solution to the deposited metal reflective layer, permitting the treatment solution to dry and/or cure, and applying a bead bond layer to the treated deposited metal reflective layer. The method further comprises removing the thermoplastic polymeric carrier layer, such that the deposited metal reflecting layer not in contact with the surface of the transparent microspheres remains present on the first major surface of the thermoplastic polymeric carrier layer.

Also described herein are intermediate articles used to prepare retroreflective articles, the intermediate articles comprising a thermoplastic polymeric carrier layer with a first major surface and a second major surface, transparent microspheres partially embedded the first major surface of the thermoplastic polymeric carrier layer, a treated reflective metal layer disposed on the first major surface of the thermoplastic polymeric carrier layer and the exposed surface of the partially embedded transparent microspheres, and a bead bond layer disposed on the treated reflective metal layer.

Additionally, retroreflective articles are described, the retroreflective articles comprising a bead bond layer, a layer of transparent microspheres partially embedded in the bead bond layer, and a treated reflective metal layer disposed between the bead bond layer and the transparent microspheres. The reflective metal layer comprises a discontinuous layer such that the reflective metal layer is disposed only on the surface of the transparent microspheres.

BRIEF DESCRIPTION OF THE DRAWINGS

The present application may be more completely understood in consideration of the following detailed description of various embodiments of the disclosure in connection with the accompanying drawings.

Figure 1:
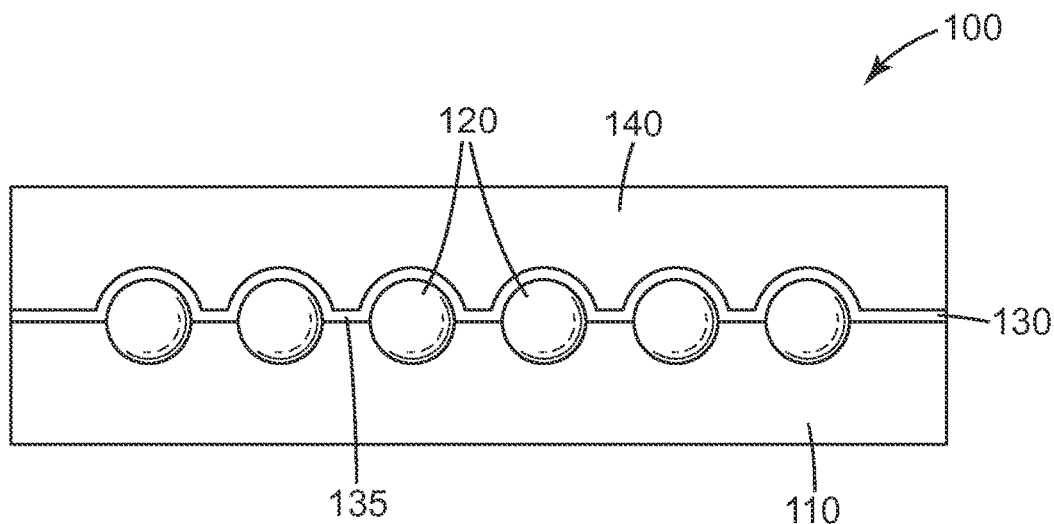
FIG. 1 shows a cross-sectional view of an embodiment of an article of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The desirability of making a wide variety of articles retroreflective has led to the increasing use of retroreflective articles. In some applications, an entire article may be made retroreflective; in others a portion of the article may be made retroreflective through the use of one or more retroreflective appliqués. The retroreflective articles typically have an optical element layer, a polymeric binder layer (typically called a bead bond layer), and a reflective layer. The optical elements commonly are microspheres that are partially embedded in the polymeric binder layer. The reflective layer typically is aluminum, silver, or a dielectric mirror that usually is disposed on the embedded portions of the microspheres. Light striking the front surface of the retroreflective article passes through the microspheres and is reflected by the reflective layer to re-enter the microspheres where the light's direction is then altered to travel back towards the light source. Thus, for example, when a vehicle's headlamps strike a retroreflective article, some of the light from the headlamps is reflected back to the driver of the vehicle. This permits the driver of the vehicle to be aware of the person wearing the retroreflective article long before the driver would see the person if he or she were not wearing the retroreflective article. These retroreflective articles and appliqués can be attached to a wide range of articles, including everything from bicycles and motorized vehicles to a wide range of clothing such as jackets, vests, shirts, shoes, hats, and the like.

Typically retroreflective articles are prepared in a multi-step process. In this process, a thermoplastic polymeric carrier layer has a plurality of transparent microspheres partially embedded in it. A reflective layer, typically a reflective metal layer such as aluminum, silver or the like, is applied to the protruding transparent microspheres. A bead bond layer is applied to the coated microsphere layer, a transfer adhesive or fabric is adhered to the bead bond layer, and the thermoplastic polymeric carrier layer is removed to generate the retroreflective article.

One consequence of this process is that the reflective metal layer is not only present on the transparent microspheres, but is also located on the spaces between the transparent microspheres. The spaces between the transparent microspheres are often referred to as "interstitial spaces" and the reflective metal located in these interstitial spaces is referred to as "interstitial metal". Upon removal of the thermoplastic polymeric carrier layer, the reflective metal layer present in the interstitial spaces is exposed.

The interstitial metal, because it is exposed, is vulnerable to corrosion; this is particularly true when the retroreflective article is exposed to sweat or other fluids. Oftentimes this exposure occurs when the garment assembler secures the appliqué to an article of clothing or the like. During shipment or storage of the retroreflective article, the areas of interstitial metal exposed to sweat or other fluids corrode, leading to the appearance of a stain on the new retroreflective article which is aesthetically undesirable.

In this disclosure, methods are described for forming retroreflective articles that do not have interstitial metal. These methods involve the treating of the reflective metal layer with a treatment solution which is permitted to dry and/or cure prior to application of the bead bond layer. When the thermoplastic polymeric carrier layer is removed, the interstitial metal is removed along with it. In addition, the application of the treatment solution also aids in making the reflective metal coating on the transparent microspheres less susceptible to oxidation and degradation.

While not wishing to be bound by theory, it is believed that the treatment solution, when applied to the reflective metal coating, penetrates the reflective metal coating and increases adhesion between the thermoplastic polymeric carrier layer and the reflective metal layer. In this way the adhesion between the thermoplastic polymeric carrier layer and the reflective metal layer is stronger than the adhesion between the bead bond layer and the reflective metal layer.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives, heat activated adhesives and laminating adhesives.

Pressure sensitive adhesive compositions are well known to those of ordinary skill in the art to possess properties including the following: (1) aggressive and permanent tack at room temperature, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Heat activated adhesives are non-tacky at room temperature but become tacky and capable of bonding to a substrate at elevated temperatures. These adhesives usually have a Tg or melting point (Tm) above room temperature. When the temperature is elevated above the Tg or Tm, the storage modulus usually decreases and the adhesive become tacky.

Laminating adhesives (also sometimes referred to as contact adhesives) are adhesives designed to form bonds to two substrates immediately after dispensing. Once the adhesive has been dispensed, there is a limited time, sometimes referred to as "open time" in which the adhesive can form a bond to two substrates. Once the open time has elapsed, the laminating adhesive is no longer capable of forming adhesive bonds. Examples of laminating adhesives are hot melt adhesives, solutions or dispersions of polymeric materials or materials curable to form polymeric materials in a liquid medium, and curable adhesives. The laminating adhesive is coated onto a substrate, a second substrate is contacted to the adhesive surface and the formed three layer construction is cooled, dried, and/or cured to form a laminate. Examples of laminating adhesives include the glue sticks used in hot glue guns (which are hot melt types of adhesives that form bonds upon cooling), casein glues, sometimes called "white glue", (which are water-borne dispersions that form bonds upon drying), and cyanoacrylate adhesives (which cure to form bonds upon exposure to air).

Unless otherwise indicated, the terms "transparent' and "optically transparent" are used interchangeably and refer to an article, film or adhesive that has a high light transmittance over at least a portion of the visible light spectrum (about 400 to about 700 nm).

As used herein, the term "polymer" refers to a polymeric material that is a homopolymer or a copolymer. As used herein, the term "homopolymer" refers to a polymeric material that is the reaction product of one monomer. As used herein, the term "copolymer" refers to a polymeric material that is the reaction product of at least two different monomers.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms. The alkylene group may also be substituted with one or more alkyl or aryl groups.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene. The arylene group may also be substituted with one or more alkyl or aryl groups.

The term "alkoxy" refers to a monovalent group of the formula —OR, where R is an alkyl group.

As used herein the terms "thermoplastic", "non-thermoplastic", and "thermoset", refer to properties of materials. Thermoplastic materials are materials which melt and/or flow upon the application of heat, resolidify upon cooling and again melt and/or flow upon the application of heat. The thermoplastic material undergoes only a physical change upon heating and cooling, no appreciable chemical change occurs. Non-thermoplastic materials are materials that do not flow upon the application of heat up to a temperature where the material begins to degrade. Thermoset materials, are curable materials that irreversibly cure, such as becoming crosslinked, when heated or cured. Once cured, the thermoset material will not appreciably melt or flow upon application of heat.

As used herein the terms "fluorinated compound" or "fluorinated group", refers to an alkyl, alkylene compound or group that has one or more hydrogen atoms replaced with fluorine atoms. Typically, all or nearly all of the hydrogen atoms in the fluorinated compounds or groups have been replaced by fluorine atoms.

As used herein, the term "silicon-based group" refers to a group that contains one or more silicon atoms. The term silicon-based group may refer to a terminal silane group (i.e, a group of the type —$SiR^1R^2R^3$, where each of the $R^1$, $R^2$, and $R^3$ groups may independently be, a hydrogen atom, an alkyl group, an alkoxy group, a hydroxyl group, or the like), or the silicon-based group may contain additional silicon-containing groups such as siloxane groups. Silicon-based groups with one or more hydrolyzable groups are ones with terminal silane groups in which at least one of $R^1$, $R^2$, and $R^3$ groups comprises a hydrolyzable group such as an alkoxy or hydroxyl group. Siloxane groups are ones with the repeat unit (—$OSiR^4R^5$—), where each $R^4$ and $R^5$ group is an alkyl or aryl group.

Disclosed herein are methods of preparing retroreflective articles. These methods involve the preparation of an intermediate article, which comprises a thermoplastic polymeric carrier layer, a layer of transparent microspheres embedded in the thermoplastic polymeric carrier layer, a treated metal reflective layer adjacent to the layer of transparent microspheres, and a bead bond layer adjacent to the treated metal reflective layer. In some embodiments, a layer may also be applied to the bead bond layer, such as a transfer adhesive layer or a fabric layer, for example. This intermediate article can be converted to a final retroreflective article by removing the thermoplastic polymeric carrier layer. Each of the steps involved in preparing this intermediate article, as well the steps involved in forming the final retroreflective articles of this disclosure, are presented in detail below.

The methods to form the intermediate article comprise providing a thermoplastic polymeric carrier layer with a first major surface and a second major surface, providing transparent microspheres, and partially embedding the transparent microspheres into the first major surface of the thermoplastic polymeric carrier layer such that the beads at least partially protrude from the first major surface of the thermoplastic polymeric carrier layer. A metal reflective layer is deposited on the first major surface of the thermoplastic polymeric carrier layer and the exposed surface of the partially embedded transparent microspheres, to form a reflective metal layer. A treatment solution is applied to the deposited metal reflective layer. The treatment solution is permitted to dry and/or cure, and a bead bond layer is applied to the treated deposited metal reflective layer. In some embodiments, a layer is applied to the bead bond layer, typically this layer is a transfer adhesive layer or a fabric layer.

This intermediate article can be immediately subjected to additional steps to generate the final retroreflective article, or the intermediate article can be stored for later use, shipped to another location, or subjected to additional processing steps such as cutting, attachment to a substrate, and the like. It is desirable to form this intermediate article, because this intermediate article can be stored, shipped, or processed without exposing the transparent microsphere layer. Once the transparent microsphere layer is exposed it is subject to potential damage from abrasion, staining, and the like.

When it is desired to form the final retroreflective article, the thermoplastic polymeric carrier layer is removed, such that the deposited metal reflecting layer not in contact with the surface of the transparent microspheres remains present on the first major surface of the thermoplastic polymeric carrier layer. In this way, the interstitial metal is at least partially removed from the retroreflective article. In some embodiments, the interstitial metal is completely or essentially completely removed.

A wide variety of materials and combinations of materials are suitable for the thermoplastic polymeric carrier layer. In some embodiments, the thermoplastic polymeric carrier layer may be a standalone layer; in other embodiments the thermoplastic polymeric carrier layer may comprise a coating of thermoplastic polymeric carrier material on the first major surface of a sheet. The sheet may comprise, for example, paper, a polymeric film, and the like. Examples of useful polymeric carrier materials include polyvinyl chloride, polysulfones, polyalkylenes such as polyethylene, polypropylene and polybutylene, polyesters, and the like.

A layer of partially embedded transparent microspheres is formed on the surface of the thermoplastic polymeric carrier layer. The monolayer of transparent microspheres is assembled by cascading transparent microspheres onto thermoplastic polymeric carrier layer, which secures the microspheres in a desired temporary assignment. Typically, the thermoplastic polymeric carrier layer is heat softened. The microspheres are generally packed as closely as possible, ideally in their closest hexagonal arrangement, to achieve very good retroreflective brightness and may be so arranged by any convenient application process, such as printing, screening, cascading, or hot rolling. Upon cooling, the thermoplastic polymeric carrier layer retains the microspheres in a desired arrangement.

Typically, the transparent microspheres are substantially spherical in shape in order to provide the most uniform and efficient retroreflection. The microspheres are substantially transparent so as to minimize absorption of light so that a large percentage of the incident light is retroreflected. The microspheres often are substantially colorless but may be tinted or colored in some other fashion.

The microspheres may be made from glass, a non-vitreous ceramic composition, or a synthetic resin. Glass and ceramic microspheres are particularly suitable because they tend to be harder and more durable than microspheres made from synthetic resins. Examples of microspheres that may be used in this disclosure are described in the following U.S. Pat. Nos. 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414.

The microspheres typically have an average diameter in the range of about 30 to 200 micrometers. Microspheres smaller than this range tend to provide lower levels of retroreflection, and microspheres larger than this range may impart an undesirably rough texture to the appliqué or may undesirably reduce its flexibility. The microspheres typically have a refractive index of about 1.7 to about 2.0, the range typically considered to be useful in exposed lens retroreflective products.

A reflective material such as a specularly reflective metal is then applied to the thermoplastic polymeric carrier layer and the microspheres so that the protruding portions of the microspheres, as well as the exposed portions of thermoplastic polymeric carrier layer, become coated with a reflective material layer. This technique facilitates the arrangement of the retroreflective elements (optical elements and reflective material) in substantially uniform direction for retroreflection. The size of the retroreflective elements, i.e. the surface portion of the microspheres covered with the reflective material, may be controlled in part by controlling the depth to which the microspheres are embedded in the polymer prior to applying the reflective material.

The reflective material can be a layer comprising an elemental metal that is capable of specularly reflecting light. A variety of metals may be used to provide a specularly reflective metal layer. These include aluminum, silver, chromium, gold, nickel, magnesium, and the like, in elemental form, and combinations thereof. Aluminum and silver are particularly suitable metals for use in a reflective layer from a performance standpoint. The metal may be a continuous coating such as is produced by vacuum-deposition, vapor coating, chemical-deposition, or electroless plating. It is to be understood that in the case of aluminum, some of the metal may be in the form of the metal oxide and/or hydroxide. Aluminum and silver metals are desirable because they tend to provide the highest retroreflective brightness. The metal layer should be thick enough to reflect incoming light. Typically, the reflective metal layer is about 50 to 150 nanometers thick.

As stated above, a treatment solution is applied to the reflective metal layer. This treatment solution is allowed to dry and/or cure to form a treated reflective metal layer. Typically the treatment solution comprises one or more treatment compounds dispersed in a liquid medium. The liquid medium may be an aqueous medium comprising water or a mixture of water and other water miscible liquids. Examples of water miscible liquids include, for example, alcohols such as methanol, ethanol, and isopropanol;

ketones such as acetone and methyl ethyl ketone; and esters such as ethyl acetate. The liquid medium may also be a non-aqueous medium comprising one or more organic solvents. Examples of suitable organic solvents include, for example, alcohols such as methanol, ethanol, and isopropanol; ketones such as acetone, methyl isobutyl ketone, and methyl ethyl ketone; and esters such as ethyl acetate.

In some embodiments, the treatment solution comprises an oligomeric siloxane having one or more reactive silanol groups such as the water-borne oligosiloxane materials commercially available from Evonik under the trade name "DYNASYLAN". Particularly suitable is the fluoroalkyl material DYNASYLAN F8815.

In other embodiments, the treatment solution comprises a fluorinated compound having one or more fluorinated groups, and one or more phosphate or phosphonate groups. Examples of such suitable compounds are described in U.S. Pat. No. 7,678,426 (Flynn et al.).

In still other embodiments, the treatment solution comprises a fluorinated compound having one or more fluorinated groups, and one or more silicon-based groups having one or more hydrolysable groups. Examples of suitable materials include perfluoropolyether silanes such as those described in U.S. Pat. No. 7,294,731 (Flynn et al.).

The treatment solution can be applied by a variety of methods including but not limited to spraying, brushing, notch bar coating, dipping and the like. The solution is generally applied with a concentration between 0.1% and 20% by weight, but can be optimized for the particular application method and the desired surface coverage.

Upon application of the treatment solution to the reflective metal layer, the treatment solution is permitted to dry and/or cure. This may be achieved by allowing the reflective metal layer with applied treatment solution to stand at room temperature for a time sufficient to permit drying and/or curing, but typically the layer is heated to effect drying and/or curing. This heating can be effected in a variety of ways, such as by placing the reflective metal layer with applied treatment solution in an oven, or by exposing the reflective metal layer with applied treatment solution to an infrared lamp, for example. In some embodiments, the reflective metal layer with applied treatment solution is placed in an oven set to a temperature of from 50° C. to 130° C. for a time of 10 minutes to 2 hours.

After the treatment solution has been applied to the reflective metal layer and the treatment solution has cured and/or dried, a bead bond is applied to the treated reflective metal layer to form a bead bond layer. This bead bond layer completely covers the treated reflective metal layer and is generally 50-250 micrometers thick, more typically 50 to 150 micrometers thick. A wide range of polymeric materials are suitable for use in the bead bond layer. Examples of suitable polymeric materials include materials that contain functional groups including urethanes, esters, ethers, ureas, epoxies, carbonates, (meth)acrylates, olefins, vinyl chlorides, amides, alkyds, and combinations thereof.

Particularly suitable polymers are phenol resole/rubber resins, crosslinked poly(urethane-ureas) and crosslinked poly(acrylates). Poly(urethane-ureas) may be formed by reacting a hydroxy-functional polyester resin with excess polyisocyanate. Alternatively, a polypropylene oxide diol may be reacted with a diisocyanate and then with a triamino-functionalized polypropylene oxide. Crosslinked poly(acrylates) may be formed by exposing acrylate oligomers to electron beam radiation such as is described, for example, In U.S. Pat. No. 5,283,101 (Li).

Examples of commercially available polymers that may be used in the bead bond layer include: NIPOL NBR 1001LG available from Zeon Chemicals, Louisville, Ky.; BRJ-473 available from SI Group, Inc, Schenectady, N.Y.; VITEL 3550B available from Bostik, Inc., Middleton, Mass.; EBECRYL 230 available from Allnex, Smryna, Ga.; JEFFAMINE T-5000, available from Huntsman Corporation, Houston, Tex.; and ACCLAIM 8200, available from Bayer Material Science, LLC, Pittsburg, Pa.

The bead bond layer material may be applied in a variety of ways, such as by coating or by lamination. In embodiments where the bead bond layer material is applied as a coating, the liquid bead bond material may be coated either as a solution or as a 100% solids composition. Typically, 100% solids compositions are applied as a hot melt coating. After coating, the applied bead bond layer material is allowed to cool or dry, and optionally cured and/or crosslinked to form the bead bond layer. In other embodiments, a sheet of the bead bond layer material is laminated to the treated reflective metal layer. The laminated sheet of bead bond material may be heated to cure and/or crosslink to form the bead bond layer.

As was discussed above, the intermediate article comprising a thermoplastic polymeric carrier layer, a layer of transparent microspheres embedded in the thermoplastic polymeric carrier layer, a treated metal reflective layer adjacent to the layer of transparent microspheres, and a bead bond layer adjacent to the treated metal reflective layer can be immediately subjected to additional steps to generate the final retroreflective article, or the intermediate article can be stored for later use, shipped to another location, or subjected to additional processing steps such as cutting, attachment to a substrate, and the like.

Removal of the thermoplastic polymeric carrier layer can be carried out in a variety of ways, either manually or mechanically. As was discussed above, upon removal of the thermoplastic polymeric carrier layer, at least a portion of the deposited metal reflecting layer not in contact with the surface of the transparent microspheres remains present on the surface of the thermoplastic polymeric carrier layer. In this way, at least some of the interstitial metal is removed from the final retroreflective article. In some embodiments, a majority (that is to say, greater than 50% by area) of the interstitial metal is removed from the final retroreflective article, and in other embodiments, essentially all of the interstitial metal is removed from the final retroreflective article.

As was mentioned above, a variety of additional processing steps can be carried out with the intermediate article. Examples of these optional steps include cutting the article to the desired size and shape, application of an adhesive layer to the bead bond layer to permit the article to be attached to a substrate, and applying a backing to the bead bond layer.

Examples of suitable adhesive layers include pressure sensitive adhesives, heat activated adhesives, and laminating adhesives. The adhesive layer may be applied to the bead bond layer by coating or by lamination of a formed adhesive layer to the bead bond layer.

A wide variety of pressure sensitive adhesives are suitable including tackified natural rubbers, synthetic rubbers, tackified styrene block copolymers, polyvinyl ethers, poly (meth) acrylates, polyurethanes, polyureas, poly-alpha-olefins, and silicones. The pressure sensitive adhesive may be covered with a release liner to protect the adhesive prior to adhesion to a substrate.

Heat activated adhesives are very similar to pressure sensitive adhesives but require the application of heat to become tacky. One advantage of heat activated adhesives is that, because they are not tacky at room temperature, they typically do not require a release liner to protect the adhesive layer prior to adhesion to a substrate.

Typically, if a laminating adhesive is used, the adhesive layer is immediately bonded to a substrate to form the adhesive substrate bond. Examples of laminating adhesives include hot melt adhesives, adhesive dispersions and suspensions, and curing adhesives such as cyanoacrylates.

The adhesive layer can be used to adhere the intermediate article to a wide range of substrates. These substrates may be the surface of an article, such as the surface of a tire, the surface of a sign, or the surface of a piece of clothing, for example. The substrate may also be backing materials such as films, foams, or fabrics, or a variety of woven or nonwoven webs.

In some embodiments, the intermediate article can be adhered to a substrate without the use of an adhesive layer. For example, the bead bond layer can act as an attachment layer, and can adhere to a substrate if the bead bond layer is contacted to the substrate while still molten or prior to crosslinking. The substrate may be the surface of an article, such as the surface of a tire, the surface of a sign, or the surface of a piece of clothing, or the substrate may comprise backing materials such as films, foams, or fabrics, or a variety of woven or nonwoven webs.

Additionally, one or more of these optional processing steps may be carried out after the thermoplastic polymeric carrier layer has been removed to form the final retroreflective article, but as mentioned above, it is advantageous to carry out these steps while the retroreflective bead surface is still protected by the thermoplastic polymeric carrier layer.

Also disclosed herein are a variety of retroreflective articles prepared using the methods described above, including intermediate articles in which the thermoplastic polymeric carrier layer is attached to the article, and final articles in which the thermoplastic polymeric carrier layer has been removed.

The intermediate articles comprise a thermoplastic polymeric carrier layer with a first major surface and a second major surface, transparent microspheres partially embedded in the first major surface of the thermoplastic polymeric carrier layer, a treated reflective metal layer disposed on the first major surface of the thermoplastic polymeric carrier layer and the exposed surface the partially embedded transparent microspheres, and a bead bond layer disposed on the treated reflective metal layer. Each of these layers is described in detail above.

The treated reflective metal layer comprises a layer of a reflective metal that has been treated with a treatment solution, as described above. The treatment involves applying the treatment solution to the reflective metal layer and drying and/or curing to produce the treated reflective metal layer.

As described above, the intermediate article may comprise a variety of optional layers. In some embodiments, the intermediate article further comprises a layer of adhesive disposed on the bead bond layer. This adhesive may be a pressure sensitive adhesive, a heat activated adhesive, or a curable adhesive such as a laminating adhesive. The adhesive layer may be applied to the bead bond layer by coating or by lamination of a formed adhesive layer to the bead bond layer. The adhesive layer may be covered by a release liner if desired, especially if the adhesive is a pressure sensitive adhesive.

In some embodiments, the bead bond layer may be adhered to a wide variety of substrates, as described above. The substrate may be the surface of an article, such as the surface of a tire, the surface of a sign, or the surface of a piece of clothing, or the substrate may comprise backing materials such as films, foams, or fabrics, or a variety of woven or nonwoven webs.

FIG. 1 shows a cross-sectional view of an embodiment of an intermediate article of this disclosure. In FIG. 1, article 100 includes thermoplastic polymeric carrier layer 110, with transparent microspheres 120 partially embedded therein. Treated metal reflective coating layer 130 is adhered to the transparent microspheres 120 and to portions of thermoplastic polymeric carrier layer 110 which lie between the transparent microspheres, labeled 135 in FIG. 1. Bead bond layer 140 covers the treated reflective metal layer 130. Treated reflective metal layer 130 has been treated as described above.

Also disclosed herein are final retroreflective articles, which are articles from which the thermoplastic polymeric carrier layer has been removed. This removal can be carried out in a variety of ways, either manually or mechanically.

The final retroreflective articles comprise a bead bond layer, a layer of transparent microspheres partially embedded in the bead bond layer, and a treated reflective metal layer disposed between the bead bond layer and the transparent microspheres, wherein the reflective metal layer comprises a discontinuous layer such that the reflective metal layer is disposed only on the surface of the transparent microspheres. The discontinuous reflective metal layer is formed upon removal of the thermoplastic polymeric carrier layer and at least a portion of the interstitial metal. The removal of the interstitial metal causes discontinuities in the reflective metal layer.

As described above, the final retroreflective article may comprise a variety of optional layers. Typically these optional layers are incorporated into the intermediate article prior to removal of the thermoplastic polymeric carrier layer, but if desired, these optional layers can be incorporated into the article after the removal of the thermoplastic polymeric carrier layer. In some embodiments, the final retroreflective article further comprises a layer of adhesive disposed on the bead bond layer. This adhesive may be a pressure sensitive adhesive, a heat activated adhesive, or a curable adhesive such as a laminating adhesive. The adhesive layer may be applied to the bead bond layer by coating or by lamination of a formed adhesive layer to the bead bond layer. The adhesive layer may be covered by a release liner if desired, especially if the adhesive is a pressure sensitive adhesive.

In some embodiments, the bead bond layer may be adhered to a wide variety of substrates, as described above. The substrate may be the surface of an article, such as the surface of a tire, the surface of a sign, or the surface of a piece of clothing, or the substrate may comprise backing materials such as films, foams, or fabrics, or a variety of woven or nonwoven webs.

Figure 2:
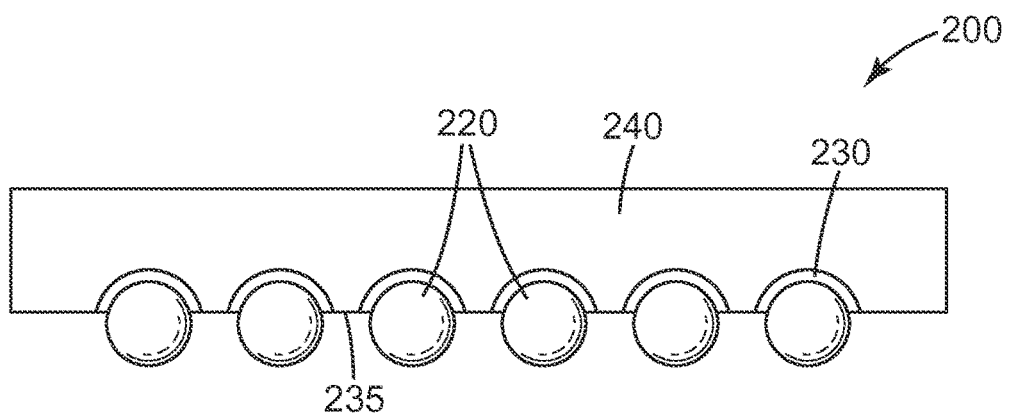
FIG. 2 shows a cross-sectional view of an embodiment of an article of this disclosure.

FIG. 2 shows a cross-sectional view of an embodiment of a retroreflective article of this disclosure. FIG. 2 is the article of FIG. 1 in which the thermoplastic polymeric carrier layer 110 has been removed. In FIG. 2, article 200 includes transparent microspheres 220 with treated metal reflective coating layer 230, partially embedded in bead bond layer 240. Treated reflective metal layer 230 has been treated as described above. Regions of the bead bond layer 240 which lie between the transparent microspheres 220, labeled 235 in FIG. 2 to correspond to regions 135 in FIG. 1, are free of the treated reflective metal layer.

The articles of this disclosure have a number of desirable properties, most notably being the fact that they are retroreflective. Typically, the coefficient of retroreflection for articles of this disclosure, as measured in accordance with ASTM E 810-03 with an entrance angle of +5° and an observation angle of 0.2°, is at least 330 cd $lx^{-1}m^{-2}$.

As mentioned above, the removal of the interstitial metal from the retroreflective article by the methods described herein produce retroreflective articles that have desirable anti-staining properties, meaning that their appearance does not change upon exposure to sweat or other fluids. These anti-staining properties and techniques for characterizing them are further described in the Examples section.

The retroreflective articles of this disclosure can be incorporated into a wide variety of commercial articles to impart retroreflectivity to the commercial articles. Examples of suitable commercial articles include: display articles such as signs, billboards, pavement markings, and the like; transportation articles such as bicycles, motorcycles, trains, buses, and the like; and clothing articles such as shirts, sweaters, sweatshirts, jackets, coats, pants, shoes, socks, gloves, belts, hats, suits, one-piece body garments, vests, bags, and backpacks, and the like.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted. The following abbreviations are used: cm=centimeters; in=inches; oz/sy=ounces per square yard.

Table of Abbreviations

| Abbreviation | Description |
|---|---|
| Treatment Material | Oligomeric siloxane commercially available from Evonik as "DYNASYLAN F8815". |
| VCBS | Vapor Coated Bead Sheet, prepared as described in Synthesis Example 1 below. |
| Bead Bond | Bead bond layer material prepared from acrylonitrile butadiene rubber (NBR) and a phenol-cresol resole resin solution. |
| Film Adhesive | Adhesive film commercially available from Bemis Associates, Shirley, MA as "Adhesive Film 3287". |
| Fabric | 65% Polyester, 35% Cotton, 3.1 oz/sy fabric available from Springs Industries, Rock Hill SC. |

Synthesis Example 1

Preparation of VCBS

For each of the Examples, glass microspheres having an average diameter of about 40 to 90 micrometers were partially embedded in a thermoplastic polymeric carrier layer. The thermoplastic polymeric carrier layer contained juxtaposed paper and polyethylene layers, and the microspheres were embedded in the polyethylene layer. A specularly reflective aluminum layer was vapor deposited over the thermoplastic polymeric carrier layer and the protruding portions of the glass microspheres to form a monolayer of retroreflective elements.

Test Methods:
Stain Test

Samples of retroreflective sheeting were tested for staining properties by placing 1 drop of a series of test solutions (listed below) on different locations of the reflective side of the sheeting and allowing the drops of solution to dry overnight. Alternatively, similar samples were tested for staining properties by applying human sweat onto the reflective side of the sheeting. The test samples were then placed in a constant temperature and humidity chamber set to 32° C./90% RH for approximately 60 hours, after which time the test samples were removed from the chamber, rinsed with deionized water, and dried. Staining properties were determined by observing whether the area that was thus tested produces an observable stain. The results are reported as "Stain" if staining was observed, or "No Stain" if no staining was observed.

Test Solutions
pH 4.00 Buffer Solution: potassium acid phthalate.
Artificial Acidic Sweat: 4.93 g sodium chloride, 0.12 g L-histidine hydrochloride monohydrate 98%, 0.45 g lactic acid 85%, 0.50 g sodium phosphate dibasic anhydrous, 500 g distilled water.
pH 7.00 Buffer Solution: dibasic sodium phosphate, monobasic potassium phosphate.
Artificial Basic Sweat: 4.85 g sodium chloride, 0.12 g L-histidine hydrochloride, monohydrate 98%, 1.96 g ammonium carbonate USP, 0.48 g sodium phosphate dibasic anhydrous, 500 g distilled water.
pH 10.00 Buffer Solution: potassium carbonate, potassium borate, potassium hydroxide.
Human Sweat: Obtained from a subject's forehead area after aerobic exercising.

EXAMPLES

Example 1 and Comparative Example C1

For Example 1, a treatment solution was prepared by combining 10 parts by weight of Treatment Material, 5 parts by weight isopropanol, and 85 parts by weight of deionized water and mixing for 5 minutes. Using a foam paint brush, the treatment solution was applied to a 30.5×61.0 cm (12×24 in) sheet of VCBS. The treated sheet was cured at 80° C. for 30 minutes. Using a lab scale notch bar coater set to 178 micrometers (7 mil) thickness, Bead Bond was coated onto the treated sheet followed by heating in a oven at 66° C. for 2.5 minutes and then at 166° C. for 4.0 minutes. To a 6.4×61 cm (2.5×24 in) strip of the bead bond side of the sheet, a 5.1×55.9 cm (2×22 in) strip of Film Adhesive was laminated with a continuous roll laminator. The steel roll (hot can) was set to 149° C. The resulting transfer film was cut into 15.2 cm (6 in) long coupons and laminated onto Fabric. The thermoplastic layers of the VCBS portion of the coupons were removed. For Comparative Example C1, identical 15.2 cm (6 in) long coupons were prepared that were not treated with the treatment solution. Using an optical microscope set to 500× power, it could be seen that the majority of the interstitial aluminum was removed from the Example samples whereas in the Comparative Example samples the interstitial aluminum was essentially intact. The Example samples and Comparative Example samples were tested using the Stain Test method described above. The results are shown in Table 1 below.

TABLE 1

| Test Solution | Example 1 | Comparative Example C1 |
| --- | --- | --- |
| pH 4.00 Buffer Solution | No Stain | Stain |
| Artificial Acidic Sweat | No Stain | Stain |
| pH 7.00 Buffer Solution | No Stain | Stain |
| Artificial Basic Sweat | No Stain | Stain |
| pH 10.00 Buffer Solution | No Stain | Stain |
| Human Sweat | No Stain | Stain |

What is claimed is:

1. A method of preparing a retroreflective article comprising:
   providing a thermoplastic polymeric carrier layer with a first major surface and a second major surface;
   providing transparent microspheres;
   partially embedding the transparent microspheres into the first major surface of the thermoplastic polymeric carrier layer such that the beads at least partially protrude from the first major surface of the thermoplastic polymeric carrier layer;
   depositing a metal reflective layer on the first major surface of the thermoplastic polymeric carrier layer and the exposed surface of the partially embedded transparent microspheres;
   applying a treatment solution to the deposited metal reflective layer;
   permitting the treatment solution to dry and/or cure; and
   then applying a bead bond layer to the treated deposited metal reflective layer.

2. The method of claim 1, wherein the deposited metal reflective layer has a thickness of from about 50 nanometers to about 150 nanometers.

3. The method of claim 1, wherein the deposited metal reflective layer comprises aluminum, silver, chromium, nickel, magnesium, gold, tin or combinations thereof.

4. The method of claim 1, wherein the treatment solution comprises an oligomeric fluoroalkyl siloxane having one or more reactive silanol groups.

5. The method of claim 1, wherein the treatment solution comprises a fluorinated compound having one or more fluorinated groups, and one or more phosphate or phosphonate groups.

6. The method of claim 1, wherein the treatment solution comprises a fluorinated compound having one or more fluorinated groups, and one or more silicon-based groups having one or more hydrolysable groups.

7. The method of claim 1, further comprising applying a layer of adhesive to the bead bond layer.

8. The method of claim 1, further comprising applying a fabric backing to the bead bond layer.

9. The method of claim 1, further comprising removing the thermoplastic polymeric carrier layer, such that the deposited metal reflecting layer not in contact with the surface of the transparent microspheres remains present on the first major surface of the thermoplastic polymeric carrier layer.

10. An article comprising:
    a thermoplastic polymeric carrier layer with a first major surface and a second major surface;
    transparent microspheres partially embedded the first major surface of the thermoplastic polymeric carrier layer;
    a treated reflective metal layer disposed on the first major surface of the thermoplastic polymeric carrier layer and the exposed surface the partially embedded transparent microspheres, wherein the treated reflective metal layer comprises a deposited layer of a reflective metal that has been treated with a treatment solution; and
    a bead bond layer disposed on the treated reflective metal layer.

11. The article of claim 10, wherein the treatment solution comprises an oligomeric fluoroalkyl siloxane having one or more reactive silanol groups.

12. The article of claim 10, wherein the treatment solution comprises a fluorinated compound having one or more fluorinated groups, and one or more phosphate or phosphonate groups.

13. The article of claim 10, wherein the treatment solution comprises a fluorinated compound having one or more fluorinated groups, and one or more silicon-based groups having one or more hydrolysable groups.

14. The article of claim 10, further comprising at least one additional layer disposed on the bead bond layer, the additional layer comprising a layer of adhesive or a backing layer.

15. A retroreflective article comprising:
    a bead bond layer;
    a layer of transparent microspheres partially embedded in the bead bond layer; and
    a treated reflective metal layer disposed between the bead bond layer and the transparent microspheres; wherein the reflective metal layer comprises a discontinuous layer such that the reflective metal layer is disposed only on the surface of the transparent microspheres.

16. The retroreflective article of claim 15, wherein the treated reflective metal layer comprises a layer of a reflective metal that has been treated with a treatment solution.

17. The retroreflective article of claim 16, wherein the treatment solution comprises an oligomeric fluoroalkyl siloxane having one or more reactive silanol groups.

18. The retroreflective article of claim 16, wherein the treatment solution comprises a fluorinated compound having one or more fluorinated groups, and one or more phosphate or phosphonate groups.

19. The retroreflective article of claim 16, wherein the treatment solution comprises a fluorinated compound having one or more fluorinated groups, and one or more silicon-based groups having one or more hydrolysable groups.

20. The retroreflective article of claim 15, further comprising at least one additional layer disposed on the bead bond layer, the additional layer comprising a layer of adhesive or a backing layer.

21. The retroreflective article of claim 15, wherein the coefficient of retroreflection as measured in accordance with ASTM E 810-03 with an entrance angle of +5° and an observation angle of 0.2° is at least 330 cd $1x^{-1}m^{-2}$.

* * * * *